United States Patent
Pozarnsky

(10) Patent No.: US 7,923,496 B1
(45) Date of Patent: Apr. 12, 2011

(54) ENHANCING THE PROPERTIES OF POLYMER MATERIALS BY USE OF ORGANIC NANOPARTICLES

(75) Inventor: Gary A. Pozarnsky, Roseville, MN (US)

(73) Assignee: APPLIED Colloids, Inc., Roseville, MN (US)

( * ) Notice: Subject to any disclaimer, the term of this patent is extended or adjusted under 35 U.S.C. 154(b) by 239 days.

(21) Appl. No.: 12/378,408

(22) Filed: Feb. 14, 2009

Related U.S. Application Data

(60) Provisional application No. 61/029,089, filed on Feb. 15, 2008.

(51) Int. Cl.
*C08K 5/05* (2006.01)

(52) U.S. Cl. ......................................... 524/383; 524/384
(58) Field of Classification Search .................. 524/383, 524/384
See application file for complete search history.

(56) References Cited

U.S. PATENT DOCUMENTS 2,809,998 A * 10/1957 Miller ........................... 568/807

* cited by examiner

*Primary Examiner* — Edward J Cain
(74) *Attorney, Agent, or Firm* — Henry E. Naylor

(57) ABSTRACT

Improving the properties of polymer materials by incorporating into a polymer material an effective amount of a modifying agent, preferably trans-4-tertbutyl-1-phenylcycolhexanol. Properties such as melting point, elastic modulus and softening temperature are improved.

19 Claims, No Drawings

US 7,923,496 B1

ENHANCING THE PROPERTIES OF POLYMER MATERIALS BY USE OF ORGANIC NANOPARTICLES

CROSS REFERENCE TO RELATED APPLICATIONS

This application is based on Provisional Application 61/029,089 filed Feb. 15, 2008.

FIELD OF THE INVENTION

This invention relates to improving the properties of polymer materials by incorporating into a polymer material an effective amount of a modifying agent, preferably trans-4-tertbutyl-1-phenylcycolhexanol. Properties such as melting point, elastic modulus and softening temperature are improved.

BACKGROUND OF THE INVENTION

Inorganic and organic polymer materials are used in myriad commercial products, particularly synthetic polymers. Non-limiting examples of important synthetic polymers include polyethylenes, polyethylene oxides, polypropylenes, polyterephthalates, polyesters, polyvinyl chlorides, polystyrenes, polytetrafluoroethylenes, polyvinylidene difluorides, polyurethanes, silicones, epoxies, and polyamides. It also includes materials with a measureable glass transition temperature not commonly referred to as polymers.

There is a continuing need to improve or alter the properties of the polymer materials. The addition of a modifying agent, such as trans-4-tertbutyl-1-phenylcyclohexanol, can improve a variety of properties of a polymer matrix, including, but not limited to, permeability, conductivity, dielectric, thermal and mechanical properties of the matrix. The advantage of utilizing this invention is that the use of a modifying agent, such as trans-4-tertbutyl-1-phenylcyclohexanol, first dissolves in the molten polymer and then precipitates out as organic nanoparticles in the polymer matrix. The result is a polymeric composite material having improved properties. This is an advantage over conventional polymer property modifying techniques that disperse preformed nanoparticles, such as carbon black and silica, into a molten, or dissolved, polymer. Such conventional techniques are prone to agglomeration and dispersion problems that adversely affect the desired properties of the polymer end product. Therefore, there is a continuing need in the art for ways to improve the properties of polymeric materials.

SUMMARY OF THE INVENTION

In accordance with the present invention there is provided a method for enhancing the elastic modulus of a polymer material, which method comprising:
  forming a melt of said polymer material;
  adding an effective amount of a modifying agent to the melt, which modifying agent is represented by the formula:

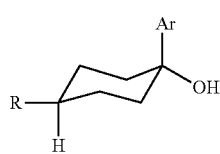

wherein R is a bulky $C_3$ to $C_{10}$ alkyl group and Ar is an aryl group;
  agitating said modified melt for an effective amount of time so that substantially all of said modifying agent dissolves in said melt, thereby resulting in a modified melt;
  solidifying said modified melt thereby resulting in the modifying agent precipitating in the form of nanoparticles dispersed throughout said polymer material and producing a modified polymer material having a higher elastic modulus compared to the starting polymer material.

In a preferred embodiment the alkyl group is selected from the group consisting of tert-butyl, sec-butyl, cyclohexyl, isopropyl, and benzyl.

In another preferred embodiment the Ar group is selected from phenyl and a phenyl group functionalized with a halogen preferably fluorine or a $C_1$ to $C_3$ alkyl or alkoxy group preferably a methyl or methoxy group.

In yet another preferred embodiment the modifying agent is trans-4-tertbutyl-1-phenylcyclohexanol.

In still another preferred embodiment the melt is formed by either heating or by use of a solvent into which the polymer material is soluble.

In another preferred embodiment, the effective amount of trans-4-tertbutyl-1-phenylcyclohexanol is from about 1 wt. % to about 12 wt. %, based on the total weight of the modified polymer matrix.

DETAILED DESCRIPTION OF THE INVENTION

There is a need in the art to enhance various properties of polymer materials. The present invention can be practiced on any type of polymer material as long as it is capable of forming a melt into which a substantial amount of modifying agent of the present invention can be dissolved and precipitated as nanoparticles upon solidification of the polymer melt. Both naturally occurring and synthetic polymer materials can be used, although synthetic polymers are preferred. Non-limiting examples of polymers that can be modified by the practice of the present invention include: polyethylenes, polypropylenes, polyterephthalates, polyesters, polyvinyl chlorides, polystyrenes, polytetrafluoroethylenes, epoxies, polyurethanes, and polyamides. This invention is also applicable to the various copolymers of these materials and polymers/copolymers reinforced with conventional reinforcing materials, such as carbon black, graphitic nanofibers, carbon fibers, micron-sized particulates and other fibrous fillers.

Non-limiting properties that would be desirable to improve include melt point, mechanical properties, softening temperature, electrical and thermal conductivity, permeability and dielectric properties. The inventor hereof has unexpectedly found that the properties of polymer materials can be substantially improved by use of an effective amount of a modifying agent of the present invention. The modifying agents of the present invention are trans-4-tertbutyl-1-phenylcyclohexanol type compounds that can be represented by the formula:

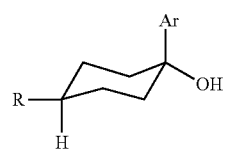

Wherein R is a bulky $C_3$ to $C_{10}$, preferably a $C_3$ to $C_8$ alkyl group selected from the group consisting of tert-butyl, sec-butyl, cyclohexyl, isopropyl, and benzyl. Preferred is when R is tert-butyl. Ar is an aryl group selected from phenyl and a phenyl group functionalized with a halogen preferably fluorine or a $C_1$ to $C_3$ alkyl or alkoxy group, preferably a methyl or methoxy group.

The addition of an effective amount of modifying agent of the present invention increases the melting point, the softening temperature, as well as improving one or more other properties, such as elastic modulus, thermal conductivity, permeability and impact resistance of the host polymer. The present invention has the advantage of being an in-situ process wherein a colloidal network (dispersed phase) of nanoparticles of modifying agent is formed within a polymer matrix (continuos phase) being modified. Conventional methods typically use a preformed modifying agent, such as carbon, silica or clay that is then dispersed in the polymer to be modified. The method of the present invention results in the precipitation of at least a fraction of the modifying agent into nanoparticles dispersed substantially homogenously within the polymer matrix. This dispersed phase has an advantageous effect on reinforcement and other properties of the polymer matrix. As previously mentioned, the present method of improving the properties of polymers is unexpectedly superior to conventional methods. Conventional polymer modifying methods typically lead to undesirable compatibility and agglomeration/dispersion problems with the polymer matrix and will not result in the desired improved properties. Practice of the present method does not lead to phase separation, agglomeration or miscibility problems.

The elevation of the melt point of the polymer matrix occurs primarily with polymers of low molecular weight of less than about 80,000 daltons, preferably less than about 70,000 daltons. (see Table 1 below) For higher molecular weight polymers of at least about 80,000 daltons, preferably at least about 90,000 daltons, the melt point is unchanged, but the formation of the nanoparticle-containing polymer composite enhances other properties, such as the elastic, or Young's, modulus, as shown in Table 2 below.

The present invention is generally practiced by dissolving an effective amount of modifying agent in a melt or suitable solvent solution of the polymer to be modified. The term "melt" as used herein refers to a melt formed by heating the polymer to its melting temperature as well as to forming a melt by use of a suitable solvent into which the polymer melts (dissolves). The term "effective amount" as used herein means at least that amount of modifying agent that will have an appreciable affect on the mechanical and other properties of the polymer being treated. By "appreciable affect" we mean that a targeted property, preferably elastic modulus will be improved by at least about 5%, more preferably by at least about 10%, and most preferably by at least 15%. Of course not so much modifying agent should be used that some of it will not dissolve in the polymer melt. Further, this effective amount of modifying agent will typically be from about 1 to about 12 wt. %, preferably about 1 to about 5 wt % based on the total weight of polymer material to be treated plus modifying agent. An effective amount will also be related to the amount of modifying agent that will be soluble in a given polymer material at a given temperature. For melt or extrusion processing, the modifying agent will substantially dissolve, then precipitate in the cooling melt to form nanoparticles dispersed throughout the melt and that will enhance the melt and resulting solid properties of the material being treated. For solvent processing of the polymer, precipitation will occur as the solvent evaporates thereby resulting in an increase of the concentration of the modifying agent. As it passes the solubility limit, the modifying agent will precipitate from solution and form nanoparticles in the polymer matrix. Practice of the present invention will also enhance the properties of blends of one or more polymeric materials.

This invention will be better understood with reference to the following examples that are presented for illustrative purposes only and are not to be taken as limiting the invention in any way.

Example 1

Two samples of polycaprolactone were melted by heating. To one of the samples trans-4-tertbutyl-1-phenylcyclohexanol (modifying agent) was added in the amount indicated in Tables 1 and 2 below. The resulting modified melt was agitated wherein substantially all of the trans-4-tertbutyl-1-phenylcyclohexanol dissolved into the melt. The molten polymer samples were cooled to solid form.

Two samples of polypropylene were also melted and to one of the samples was added trans-4-tertbutyl-1-phenylcyclohexanol in the amount indicated in Table 2 below. The melts were agitated then cooled to solid form. It was found that for all samples containing the modifying agent, the modifying agent dissolved in the melts and then precipitated into nanoparticles that became dispersed throughout the solidified polymer material.

The melting points of the resulting solidified polymer samples were then tested by ASTM D217 and by the use of a PTC Instruments Melt Point Model 333. The relationship of the melt point to the concentration of the trans-4-tertbutyl-1-phenylcyclohexanol is shown in Table 1 hereof. The data in Table 1 below shows the effect on melt point that a modifying agent of the present invention has on a relatively low molecular weight polymer sample. There was substantially no effect on the melt point of the higher molecular weight polymer sample, polypropylene, by the addition of the modifying agent.

The data of Table 2 evidences that the elastic modulus of both the lower molecular weight polymer and the higher molecular weight polymer were improved by the addition of the modifying agent of the present invention which forms a substantially homogeneous dispersion of precipitated modifying agent nanoparticles throughout the polymer matrix.

TABLE 1

Melt Point

|  | 0 wt % | 10 wt % |
| --- | --- | --- |
| Polycaprolactone (~60,000 daltons) | 60° C. | 90° C. |

TABLE 2

Elastic Modulus

|  | 0 wt % | 10 wt % |
| --- | --- | --- |
| Polycaprolactone (~60,000 daltons) | 32,700 psi | 33,900 psi |
| Polypropylene (~100,000 daltons) | 10,000 psi | 24,000 psi |

Example 2

Increase of Adhesive Peel Strength 1 wt % the modifying agent (MA) trans-4-tertbutyl-1-phenylcyclohexanol was added to a polysiloxane polymer/gum dispersion (Dow Corning 7355) in xylene followed by cross linking with 2 wt % benzoyl peroxide. A pressure sensitive adhesive (PSA) was formed which was coated onto polyester/Teflon backings. The peel strength of the pressure sensitive adhesives was then measured. From Table 3 below it is seen that the peel strength of the pressure sensitive adhesive material was increased about 10% relative to that of the baseline silicone adhesive. In addition, it has been shown that the addition of polar materials to PSAs increases the adhesion to various substrates. The addition of metallic salts of carboxylic acids, such as zirconium 2-ethylhexanoate (12 wt %) in mineral spirits (Zirconium Hex Cem™, Westlake, Ohio, can also increase the adhesion of these PSAs to the surface of the stainless steel coupons and also to polyurethane surfaces.

TABLE 3

Peel Strength of Silicone PSA and Nanocomposites

|  | Stainless Steel (lbs/in) | Polyurethane surface |
| --- | --- | --- |
| Baseline Silicone Adhesive | 2.4 | 2.0 |
| 1 wt % MA./Silicone Adhesive | 2.75 | 2.0 |
| 1 wt % MA/1 wt % Zr Hex-cem/Silicone Adhesive | 4.1 | 4.0 |

What is claimed is:

1. A method for enhancing the elastic modulus of a polymer material, which method comprising:
   forming a melt of said polymer material;
   adding an effective amount of a modifying agent to the melt, which modifying agent is represented by the formula:

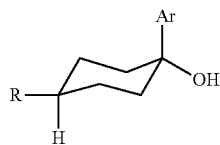

wherein R is a bulky $C_3$ to $C_{10}$ alkyl group and Ar is an aryl group;
   agitating said modified melt for an effective amount of time so that substantially all of said modifying agent dissolves in said melt, thereby resulting in a modified melt;
   solidifying said modified melt thereby resulting in the modifying agent precipitating in the form of nanoparticles dispersed throughout said polymer material and producing a modified polymer material having a higher elastic modulus compared to the starting polymer material.

2. The method of claim 1 wherein the R group is a $C_3$ to $C_8$ bulky alkyl group.

3. The method of claim 2 wherein the R group is selected from the group consisting of tert-butyl, sec-butyl, cyclohexyl, isopropyl, and benzyl.

4. The method of claim 3 wherein the R group is a tert-butyl group.

5. The method of claim 1 wherein the Ar group is selected from the group consisting of phenyl and a phenyl group functionalized with a halogen preferably fluorine or a $C_1$ to $C_3$ alkyl or alkoxy group preferably a methyl or methoxy group.

6. The method of claim 5 wherein the Ar group is a phenyl group.

7. The method of claim 4 wherein the Ar group is a phenyl group and the modifying agent is trans-4-tertbutyl-1-phenyl-cyclohexanol.

8. The method of claim 1 wherein the amount of modifying agent used is from about 1 to 12 wt. % based on the weight of modifying agent plus polymer material.

9. The method of claim 8 wherein the amount of modifying agent used is from about 1 to 5 wt. % based on the weight of modifying agent plus polymer material.

10. The method of claim 1 wherein the polymer material is selected from the group consisting of polyethylenes, polypropylenes, polyterephthalates, polyesters, polyvinyl chlorides, polystyrenes, polytetrafluoroethylenes, epoxies, polyurethanes, and polyamides.

11. The method of claim 1 wherein the melt is formed by heating the polymer material.

12. The method of claim 1 wherein the melt is formed by dissolving the polymer material in a suitable solvent.

13. The method of claim 11 wherein the melt is solidified by cooling.

14. The method of claim 12 wherein the melt is solidified by driving off solvent.

15. A method for enhancing the elastic modulus of a polymer material, which method comprising:
   forming a melt of said polymer material;
   adding an effective amount of a modifying agent to the melt, which modifying agent is represented by the formula:

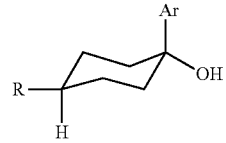

wherein R is a tert-butyl group and Ar is a phenyl group;
   agitating said mixture for an effective amount of time so that substantially all of said modifying agent dissolves in said melt, thereby resulting in a modified melt;
   solidifying said modified melt thereby resulting in the modifying agent precipitating to nanoparticles dispersed throughout said polymer material and producing a modified polymer material having a higher elastic modulus compared to the starting polymer material.

16. The method of claim 15 wherein the amount of modifying agent used is from about 1 to 12 wt. % based on the weight of modifying agent plus polymer material.

17. The method of claim 16 wherein the amount of modifying agent used is from about 1 to 5 wt. % based on the weight of modifying agent plus polymer material.

18. The method of claim 15 wherein the polymer material is selected from the group consisting of polyethylenes, polypropylenes, polyterephthalates, polyesters, polyvinyl chlorides, polystyrenes, polytetrafluoroethylenes, epoxies, polyurethanes, and polyamides.

19. The method of claim 1 wherein the melt is formed by heating the polymer material or by dissolving the polymer material in a suitable solvent.

* * * * *